US 8,726,705 B2

(12) United States Patent
Tabe et al.

(10) Patent No.: US 8,726,705 B2
(45) Date of Patent: May 20, 2014

(54) DOOR OPENING AND CLOSING DEVICE FOR VEHICLE

(75) Inventors: Koichi Tabe, Miyazaki (JP); Koichi Takenoshita, Miyazaki (JP); Yuki Ishibashi, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 279 days.

(21) Appl. No.: 13/058,129

(22) PCT Filed: Jul. 22, 2009

(86) PCT No.: PCT/JP2009/063102
§ 371 (c)(1),
(2), (4) Date: Feb. 8, 2011

(87) PCT Pub. No.: WO2010/032552
PCT Pub. Date: Mar. 25, 2010

(65) Prior Publication Data
US 2011/0179835 A1    Jul. 28, 2011

(30) Foreign Application Priority Data
Sep. 16, 2008  (JP) .................................. 2008-236511

(51) Int. Cl.
*B60R 25/00*  (2013.01)
*E05B 65/20*  (2006.01)
*B60R 25/01*  (2013.01)

(52) U.S. Cl.
CPC ....................................... *B60R 25/01* (2013.01)
USPC ............. 70/237; 70/379 A; 70/379 R; 70/461

(58) Field of Classification Search
USPC ....... 70/237, 238, 372, 374, 379 R, 380, 461, 70/466, 106
See application file for complete search history.

(56) References Cited

U.S. PATENT DOCUMENTS 3,143,874 A * 8/1964 Jacobi .......................... 70/379 R
4,519,227 A * 5/1985 Dumbser et al. ................ 70/264
(Continued)

FOREIGN PATENT DOCUMENTS

CN    2170360 Y    6/1994
JP    2005-290868 A    10/2005
(Continued)

OTHER PUBLICATIONS

Official Communication dated Dec. 4, 2012.

*Primary Examiner* — Suzanne Barrett
*Assistant Examiner* — David R Hare
(74) *Attorney, Agent, or Firm* — Arent Fox LLP

(57) ABSTRACT

A door opening and closing device for a vehicle is provided in which a pivoting force of a rotor pivoting in response to a key operation of a cylinder lock is transmitted to a key operating force input member side of a door lock device via a pivot rod, wherein pivoting force transmission means (18) is provided between a pivot rod (17) and the key operating force input member, the pivoting force transmission means (18) being formed by housing within an extension case (103) a driven-side pivot member detachably linked to the key operating force input member in a relatively non-pivotable manner, a drive-side pivot member detachably linked to the other end part of the pivot rod (17) in a relatively non-pivotable manner, and a transmission member transmitting a pivoting force from the drive-side pivot member to the driven-side pivot member, and the extension case (103) is detachably mounted on a casing (25A) of a door lock device (16A) so as to extend from the casing (25A). This enables the degree of freedom in layout of a lock/unlock switching mechanism with respect to the cylinder lock to be increased without causing any increase in the dimensions of the lock/unlock switching mechanism.

3 Claims, 13 Drawing Sheets

(56) References Cited

U.S. PATENT DOCUMENTS

| | | | |
|---|---|---|---|
| 6,085,558 A * | 7/2000 | Strathmann | 70/153 |
| 6,415,636 B1 * | 7/2002 | Fukumoto et al. | 70/208 |
| 6,655,179 B2 * | 12/2003 | Kobayashi et al. | 70/237 |
| 6,938,446 B2 * | 9/2005 | Fukunaga et al. | 70/237 |
| 6,976,375 B2 * | 12/2005 | Minix | 70/208 |
| 7,213,428 B2 * | 5/2007 | Harada et al. | 70/256 |
| 2002/0056298 A1 | 5/2002 | Fukunaga et al. | |

FOREIGN PATENT DOCUMENTS

| | | |
|---|---|---|
| JP | 3777968 B2 | 5/2006 |
| JP | 3906131 B2 | 4/2007 |

* cited by examiner

UNLOCKED STATE

LOCKED STATE

DOOR OPENING AND CLOSING DEVICE FOR VEHICLE

TECHNICAL FIELD

The present invention relates to a door opening and closing device for a vehicle that includes a door lock device that is mounted on a door and includes a latch mechanism that can switch between a locked state in which opening of the door is disabled and an unlocked state in which opening of the door is enabled and a lock/unlock switching mechanism having a key operating force input member that pivots so as to switch between the locked state and the unlocked state of the latch mechanism, a cylinder lock that is mounted on the door and has a rotor that pivots in response to a key operation, and a pivot rod having one end part linked to the rotor side so as to transmit to the key operating force input member side a pivoting force of the rotor pivoting in response to a key operation of the cylinder lock.

BACKGROUND ART

A door opening and closing device for a vehicle in which a pivoting force from a cylinder lock side is transmitted to a key operating force input member of a lock/unlock switching mechanism via a pivot rod, and in response to pivoting of the key operating force input member, switching is carried out between an unlocked state in which opening of a door is enabled and a locked state in which opening of the door is disabled is known from, for example, Patent Document 1 and Patent Document 2.
Patent Document 1: Japanese Patent No. 3777968
Patent Document 2: Japanese Patent No. 3906131

DISCLOSURE OF INVENTION

Problems to be Solved by the Invention

However, in the arrangement disclosed by Patent Document 1 above, the pivot rod, which extends from the cylinder lock side, is tiltably linked to a key rotor, which is the key operating force input member of the lock/unlock switching mechanism in a door lock device. Therefore, although some degree of tilting of the pivot rod is permitted, a case in which the lock/unlock switching mechanism is disposed at a position that is a large distance from the cylinder lock cannot be dealt with, the relative positioning of the cylinder lock and the lock/unlock switching mechanism is restricted, and there is a constraint in terms of layout.

Furthermore, in the arrangement disclosed by Patent Document 2 above, the lock/unlock switching mechanism is arranged so that the key operating force input member can be disposed selectively at one position among a plurality of positions, and selecting one position for the key operating force input member to be disposed enables restrictions on the relative positions of the cylinder lock and the lock/unlock switching mechanism to be alleviated, thus increasing the degree of freedom in terms of layout. However, in the lock/unlock switching mechanism, since the key operating force input member is disposed selectively, it is necessary to ensure that there are a plurality of positions, thereby resulting in an increase in the size of the lock/unlock switching mechanism.

The present invention has been accomplished in the light of such circumstances, and it is an object thereof to provide a door opening and closing device for a vehicle that enables the degree of freedom in layout of a lock/unlock switching mechanism relative to a cylinder lock to be increased without causing any increase in the size of the lock/unlock switching mechanism.

Means for Solving the Problems

In order to attain the above object, according to a first aspect of the present invention, there is provided a door opening and closing device for a vehicle comprising: a door lock device mounted on a door and comprising a latch mechanism that can switch between a locked state in which opening of the door is disabled and an unlocked state in which opening of the door is enabled and a lock/unlock switching mechanism having a key operating force input member that pivots so as to switch between the locked state and the unlocked state of the latch mechanism; a cylinder lock mounted on the door and having a rotor that pivots in response to a key operation; and a pivot rod having one end part linked to the rotor side so as to transmit to the key operating force input member side a pivoting force of the rotor pivoting in response to a key operation of the cylinder lock, characterized in that the door opening and closing device comprises pivoting force transmission means formed by housing a driven-side pivot member, a drive-side pivot member, and a transmission member within an extension case, the driven-side pivot member being coaxially and detachably linked to the key operating force input member in a relatively non-pivotable manner, the drive-side pivot member having an axis parallel to the pivot axis of the driven-side pivot member, being disposed at a position spaced from the driven-side pivot member, and being coaxially and detachably linked to the other end part of the pivot rod in a relatively non-pivotable manner, the transmission member being provided between the drive-side and driven-side pivot members so as to transmit a pivoting force from the drive-side pivot member to the driven-side pivot member, the extension case pivotably supporting the driven-side pivot member and the drive-side pivot member, and the extension case being detachably mounted on a casing of the door lock device so as to extend from the casing.

According to a second aspect of the present invention, in addition to the first aspect, the drive-side and driven-side pivot members are provided with link arm portions respectively, and opposite end parts of a transmission rod, which is the transmission member, are engaged with the link arm portions of the drive-side and driven-side pivot members.

According to a third aspect of the present invention, in addition to the second aspect, a first engagement hole is provided in the link arm portion of one of the drive-side and driven-side pivot members, a second engagement hole having an axis parallel to the first engagement hole and an insertion hole intersecting an intermediate part of the second engagement hole at right angles are provided in the link arm portion of the other of the drive-side and driven-side members, a rod-shaped first engagement portion detachably engaged with the first engagement hole is provided integrally with one end part of the transmission rod so as to be connected at right angles, a second engagement portion detachably engaged with the second engagement hole is provided integrally with the other end part of the transmission rod, and the second engagement portion is formed so that the second engagement portion can be inserted into the insertion hole when the transmission rod is in a first attitude in which the first engagement portion is disposed on a plane perpendicular to the axes of the first and second engagement holes and the second engagement portion engages with the second engagement hole when the transmission rod in a state in which the second engagement portion is inserted into the insertion hole is put in a second attitude in which the transmission rod is pivoted by 90 degrees from the first attitude.

A cylinder lever 90 of an embodiment corresponds to the key operating force input member of the present invention, and a transmission rod 102 of the embodiment corresponds to the transmission member of the present invention.

Effects of the Invention

In accordance with the first aspect of the present invention, since the case of the pivoting force transmission means is detachably mounted on the casing of the door lock device, the pivoting force transmission means transmitting a pivoting force to the key operating force input member from the pivot rod disposed at a position spaced from the key operating force input member of the lock/unlock switching mechanism, by preparing the pivoting force transmission means, which corresponds to the relative positions of the cylinder lock and the lock/unlock switching mechanism, it becomes possible to transmit a pivoting force from the cylinder lock to the key operating force input member of the lock/unlock switching mechanism via the pivot rod, and it is possible to increase the degree of freedom in layout of the lock/unlock switching mechanism in the door lock device with respect to the cylinder lock. Moreover, the case of the pivoting force transmission means is detachably mounted on the casing of the door lock device, changes in relative position between the cylinder lock and the lock/unlock switching mechanism can be dealt with by the pivoting force transmission means, and the lock/unlock switching mechanism can be one and the same, thus avoiding any increase in the dimensions of the lock/unlock switching mechanism.

Furthermore, in accordance with the second aspect of the present invention, opposite ends of the transmission rod, which is the transmission member, are engaged with the drive-side and driven-side pivot member link arm portions, the arrangement of the pivoting force transmission means can therefore be simplified, and changes in relative position of the cylinder lock and the lock/unlock switching mechanism can be dealt with easily by changing the length of the transmission rod.

Moreover, in accordance with the third aspect of the present invention, the first engagement hole is provided in the link arm portion of one of the drive-side and driven-side pivot members, the second engagement hole having an axis parallel to the first engagement hole and the insertion hole intersecting the intermediate part of the second engagement hole at right angles are provided in the link arm portion of the other of the drive-side and driven-side pivot members, the rod-shaped first engagement portion is provided integrally with one end part of the transmission rod so as to be connected at right angles, the second engagement portion is provided integrally with the other end part of the transmission rod, and the second engagement portion is formed so that it can be inserted into the insertion hole when the transmission rod is in the first attitude in which the first engagement portion is disposed on the plane perpendicular to the axes of the first and second engagement holes and it engages with the second engagement hole when the transmission rod in a state in which the second engagement portion is inserted into the insertion hole is put in the second attitude in which the transmission rod is pivoted by 90 degrees from the first attitude; therefore, after the second engagement portion is inserted into the insertion hole in a state in which the transmission rod is in the first attitude, putting the transmission rod in the second attitude enables the second engagement portion of the transmission rod to be engaged with the link arm portion of the other of the drive-side and driven-side pivot members. Moreover, in a state in which the drive-side and driven-side pivot members are linked to each other by the transmission rod, detachment of the first engagement portion on one end part of the transmission rod from the first engagement hole is prevented by the second engagement portion being inserted into the insertion hole, changing of the attitude of the transmission rod from the second attitude to the first attitude in order to detach the second engagement portion on the other end part of the transmission rod from the second engagement hole is prevented by the first engagement portion being inserted into and engaged with the first engagement hole; it is therefore unnecessary to employ any special component for preventing the transmission rod from detaching from the drive-side and driven-side pivot members, thereby enabling a state in which the drive-side and driven-side pivot members are linked by the transmission rod to be reliably maintained while avoiding any increase in the number of components.

EXPLANATION OF REFERENCE NUMERALS AND SYMBOLS

Figure 1:
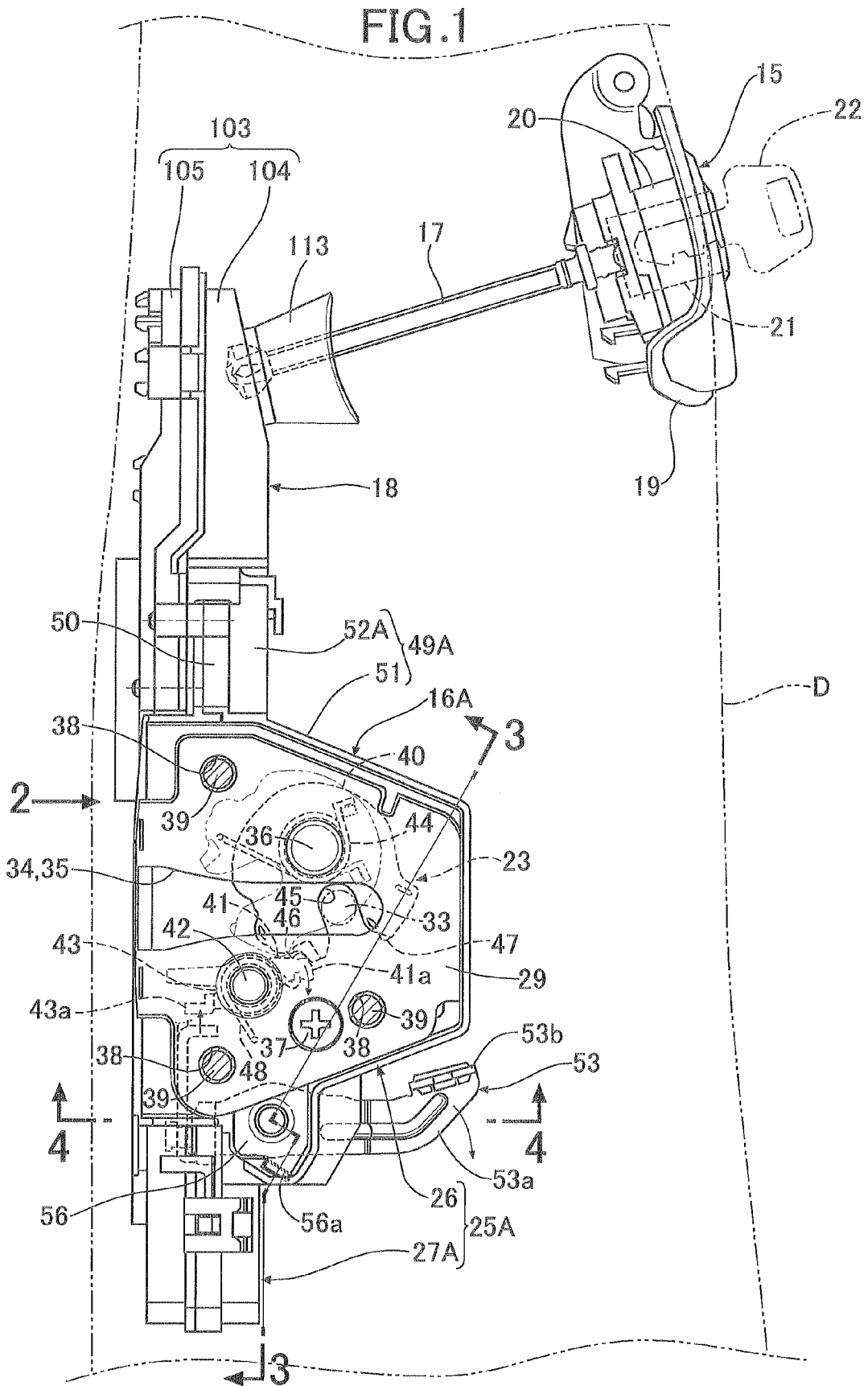
FIG. 1 is a side view showing a state in which a cylinder lock and a door lock device are linked within a vehicular door. (first embodiment)

15 Cylinder lock
16A Door lock device
17 Pivot rod
18 Pivoting force transmission means
21 Rotor
23 Latch mechanism
24 Lock/unlock switching mechanism 25A Casing
90 Cylinder lever, which is a key operating force input member
100 Driven side pivot member
100a, 101a Link arm portion
101 Drive side pivot member
102 Transmission rod, which is a transmission member
102a First engagement portion
102b Second engagement portion
103 Extension case
120 First engagement hole
121 Second engagement hole
122 Insertion hole
D Door

BEST MODE FOR CARRYING OUT THE INVENTION

A mode for carrying out the present invention is explained below by reference to an embodiment of the present invention shown in the attached drawings.
Embodiment 1

FIG. 1 to FIG. 13 show one embodiment of the present invention.

First, in FIG. 1, for example, a right side door D of a passenger vehicle is provided with a cylinder lock 15, and a door lock device 16A that switches between a locked state and an unlocked state of the door D in response to a key operation of the cylinder lock 15, a pivoting force accompanying a key operation of the cylinder lock 15 being transmitted to the door lock device 16A via a pivot rod 17 and pivoting force transmission means 18.

A handle case 19 is mounted on the outside of the door D, an outside handle (not illustrated) is pivotably supported on the handle case 19, and the cylinder lock 15 is mounted on the handle case 19. A rotor 21 is pivotably inserted into a cylinder body 20 of the cylinder lock 15, one end part of the pivot rod 17 being relatively non-pivotably linked to the rotor 21, and by inserting a legitimate key 22 into the rotor 21 and pivoting it the rotor 21 and the pivot rod 17 are pivoted.

By pivoting the rotor 21 of the cylinder lock 15 by means of the legitimate key 22 a pivoting force is inputted from the pivot rod 17 into the door lock device 16A via the pivoting force transmission means 18, thereby switching the door lock device 16A in an unlocked state to a locked state, and even if the outside handle is operated in this state the door D remains closed. Furthermore, if a pivoting force is inputted from the pivot rod 17 into the door lock device 16A via the pivoting force transmission means 18 by pivoting the rotor 21 of the cylinder lock 15 by means of the legitimate key 22 when the door lock device 16A is in a locked state, the door lock device 16A attains an unlocked state, and operating the outside handle in this unlocked state enables the door D to be opened.

Figure 2:
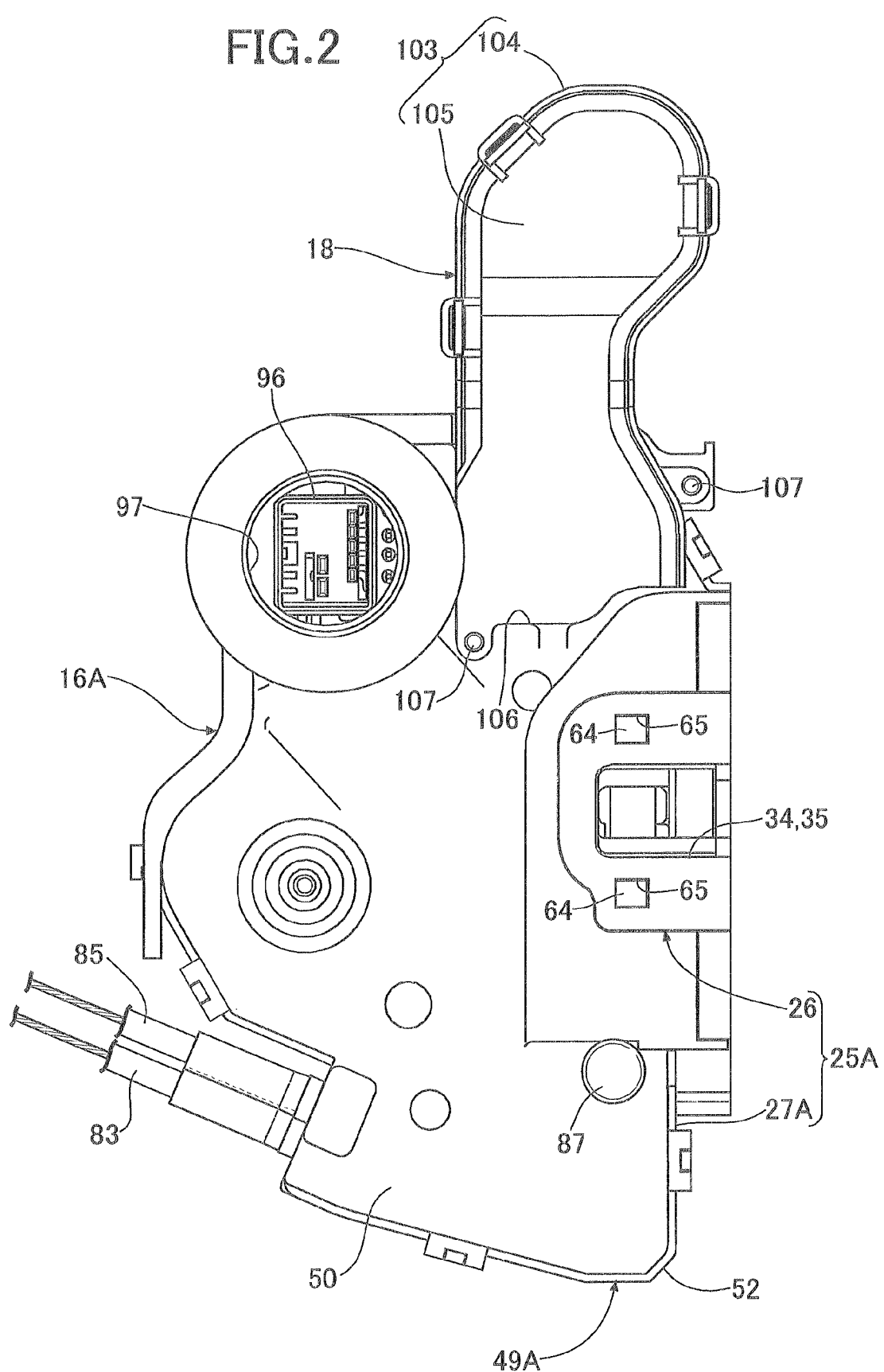
FIG. 2 is a view from arrow 2 in FIG. 1. (first embodiment)
Figure 3:
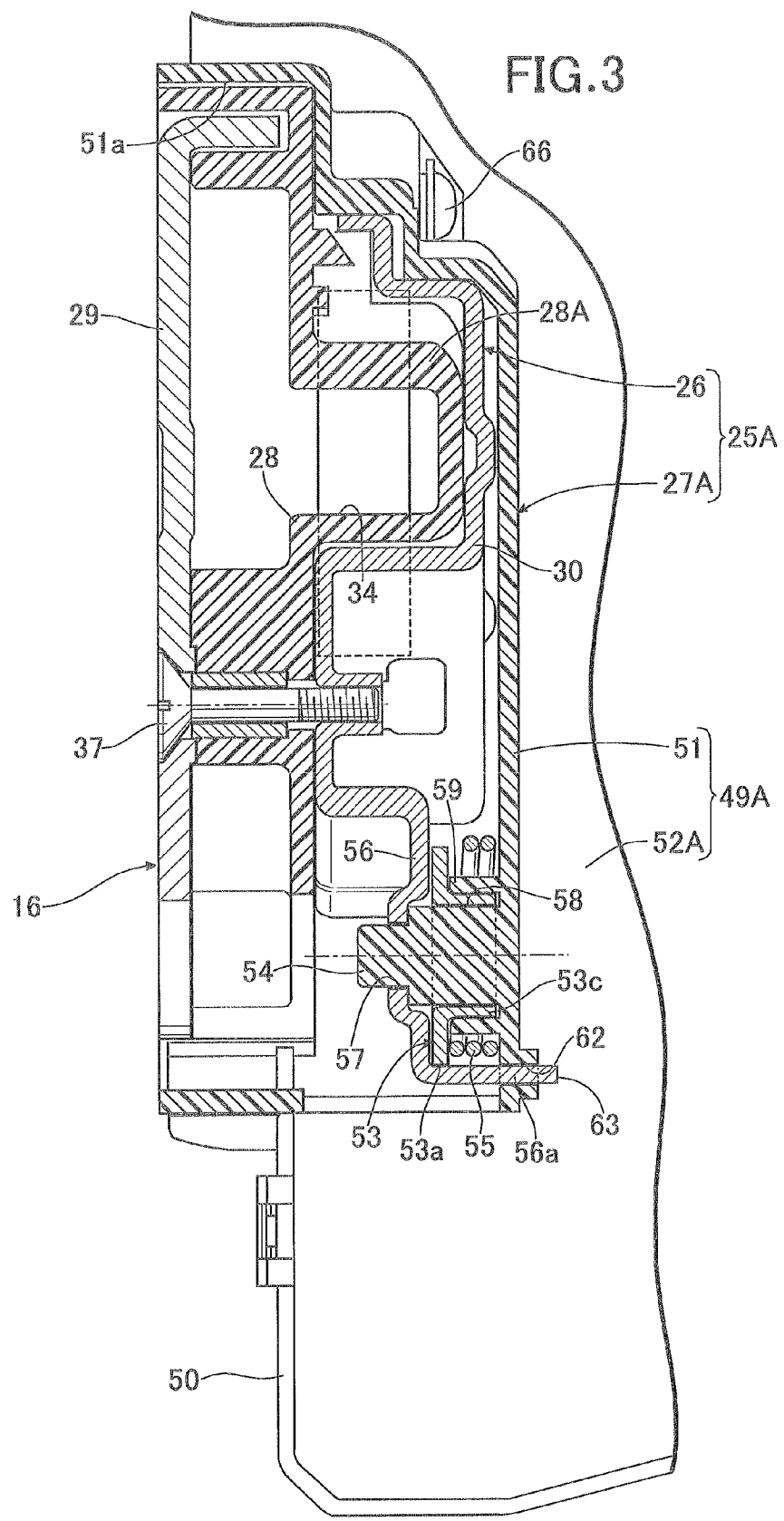
FIG. 3 is a sectional view along line 3-3 in FIG. 1. (first embodiment)
Figure 4:
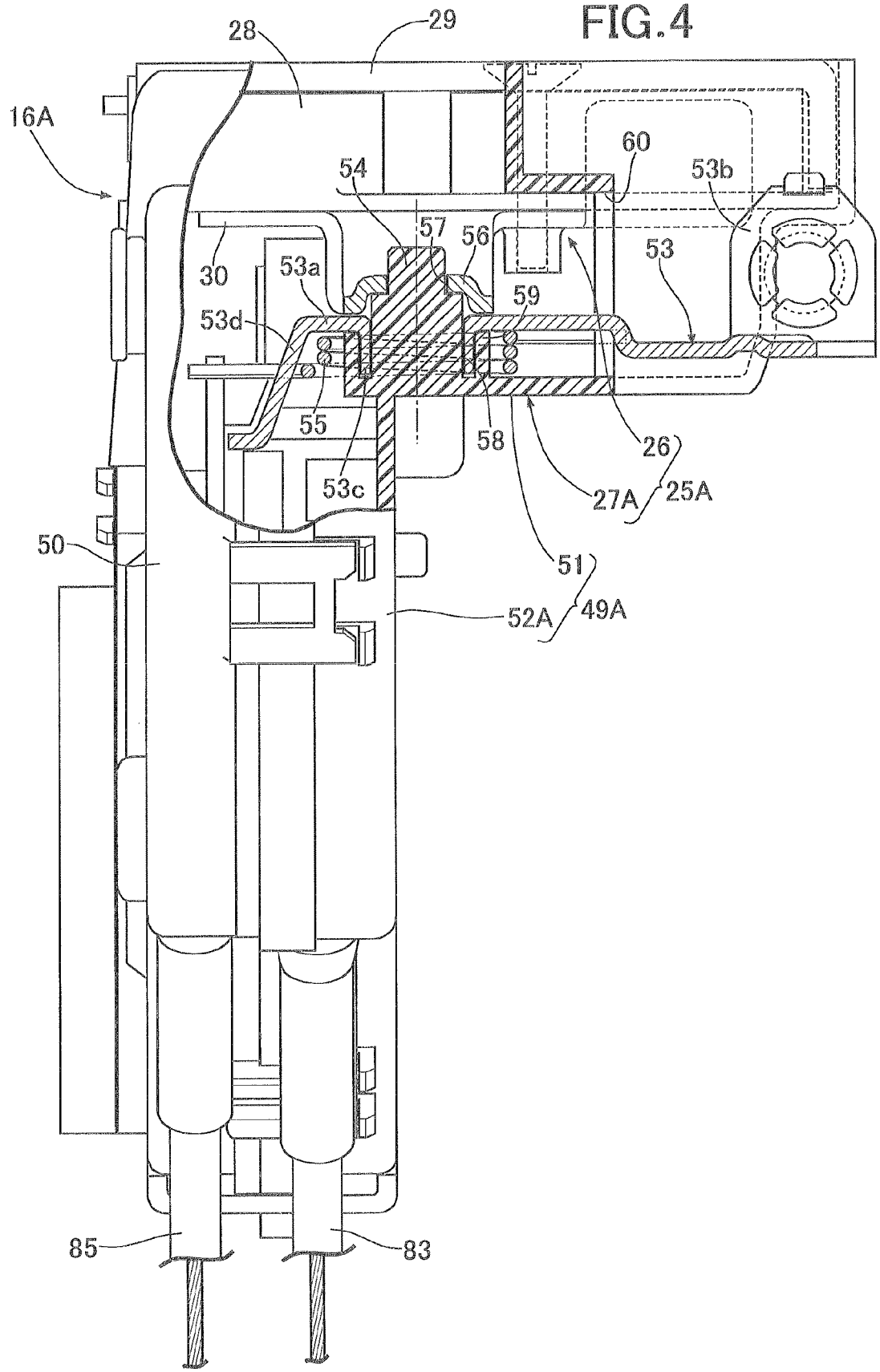
FIG. 4 is a sectional view along line 4-4 in FIG. 1. (first embodiment)

Referring in addition FIG. 2 to FIG. 4, the door lock device 16A includes a latch mechanism 23 that can switch between a locked state in which opening of the door D is disabled and an unlocked state in which opening of the door D is enabled, and a lock/unlock switching mechanism 24 (see FIG. 7 and FIG. 8) that switches between the locked state and the unlocked state of the latch mechanism 23, a casing 25A of this door lock device 16A being formed by mounting a first case 26 housing the latch mechanism 23 on a second case 27A housing the lock/unlock switching mechanism 24.

The first case 26 is formed from a case main body 28 formed from a synthetic resin into a box shape so as to house the latch mechanism 23, a cover plate 29 made of metal and blocking an opening of the case main body 28, and a back plate 30 made of metal, the case main body 28 being interposed between the back plate 30 and the cover plate 29.

The case main body 28 is provided integrally with an expanded portion 28a that expands toward the side that is away from the cover plate 29, an approach groove 34 for a striker 33 (see FIG. 1) fixed to the vehicle body side to approach is formed by means of the expanded portion 28a, and the cover plate 29 is provided with an opening 35 corresponding to the approach groove 34. A rivet shaft 36 that is inserted through the case main body 28 above the approach groove 34 and the opening 35 is provided between the cover plate 29 and the back plate 30, and a screw member 37 that is inserted through the cover plate 29 and the case main body 28 beneath the approach groove 34 and the opening 35 is screwed into the back plate 30.

The cover plate 29 and the case main body 28 are provided with three through holes 38, and the back plate 30 is provided with threaded holes (not illustrated) individually corresponding to the through holes 38. The first case 26, that is, the casing 25A, is thus secured to the door D by means of bolts 39 inserted through the through holes 38 and screwed into the corresponding threaded holes.

Referring to FIG. 1, the latch mechanism 23 includes a latch 40 that can pivot in a door closing direction by engaging with the striker 33, and a ratchet 41 that can engage with the latch 40 so as to maintain the pivoting position of the latch 40.

The latch 40 is inserted into the case main body 28 of the first case 26 and pivotably supported on the rivet shaft 36 provided between the cover plate 29 and the back plate 30 having the case main body 28 interposed therebetween. Furthermore, a pivot shaft 42 having an axis parallel to the rivet shaft 36 is pivotably supported around the axis, beneath the approach groove 34, on the cover plate 29 and the back plate 30 having the case main body 28 interposed therebetween, and the ratchet 41 housed within the case main body 28 of the first case 26 is fixed to the pivot shaft 42.

Moreover, a ratchet lever 43 is fixed to an end part of the pivot shaft 42 projecting from the back plate 30 of the first case 26, this ratchet lever 43 pivoting together with the ratchet 41. That is, the latch 40 is pivotably supported on the rivet shaft 36 above the approach groove 34, whereas the ratchet 41 and the ratchet lever 43, which pivot as a unit, are fixed to the pivot shaft 42 beneath the approach groove 34 so that the approach groove 34 is interposed between them and the latch 40.

A spring 44 is provided between the latch 40 and the case main body 28, a spring force exhibited by this spring 44 urging the latch 40 to pivot in a door-opening direction. An outer peripheral part of this latch 40 is provided with an engagement groove 45, a full engagement step 46, and a half engagement step 47, the striker 33 approaching the approach groove 34 engaging with the engagement groove 45 when the latch 40 is at the end of pivoting in the door-opening direction.

On the other hand, the ratchet 41 is provided integrally with an engagement arm portion 41a projecting toward the latch 40 side so as to engage with the full engagement step 46 and the half engagement step 47 of the latch 40. Furthermore, a torsion spring 48 surrounding the pivot shaft 42 is provided between the ratchet 41 and the back plate 30, and a spring force of this torsion spring 48 urges the ratchet 41, which pivots integrally with the ratchet lever 43, to pivot in a direction in which it engages with the latch 40 (anticlockwise direction in FIG. 1).

When the latch 40 is at the end of pivoting in the door-opening direction, the outer periphery of the ratchet 41 is in contact with the outer periphery of the half engagement step 47 of the latch 40; when the latch 40 is pushed by the striker 33 approaching the approach groove 34 and pivots in the door-closing direction (anticlockwise direction in FIG. 1), the striker 33 engages with the engagement groove 45, and the outer periphery of ratchet 41 changes its contact position from the outer periphery of the half engagement step 47 to the outer periphery of the full engagement step 46. During this process, the engagement arm portion 41a of the ratchet 41 engages with the half engagement step 47, thus maintaining a half-shut state of the door D. Furthermore, when the latch 40 pivots further in the door-closing direction in response to the striker 33, which is engaged with the engagement groove 45, advancing further inward within the approach groove 34, the ratchet 41, which is in sliding contact with the outer periphery of the full engagement step 46, makes its engagement arm portion 41a engage with the full engagement step 46, thereby locking the door D in a fully door-closed state.

The ratchet lever 43 is provided integrally with an input arm portion 43a (see FIG. 1) extending toward the inside of the door D; the locked state of the latch mechanism 23 locking the door D in the fully door-closed state is released in response to the ratchet lever 43 and the ratchet 41 pivoting in the clockwise direction in FIG. 1 in response to an unlocking operation force being inputted into the input arm portion 43a, and the latch mechanism 23 attains an unlocked state.

Figure 5:
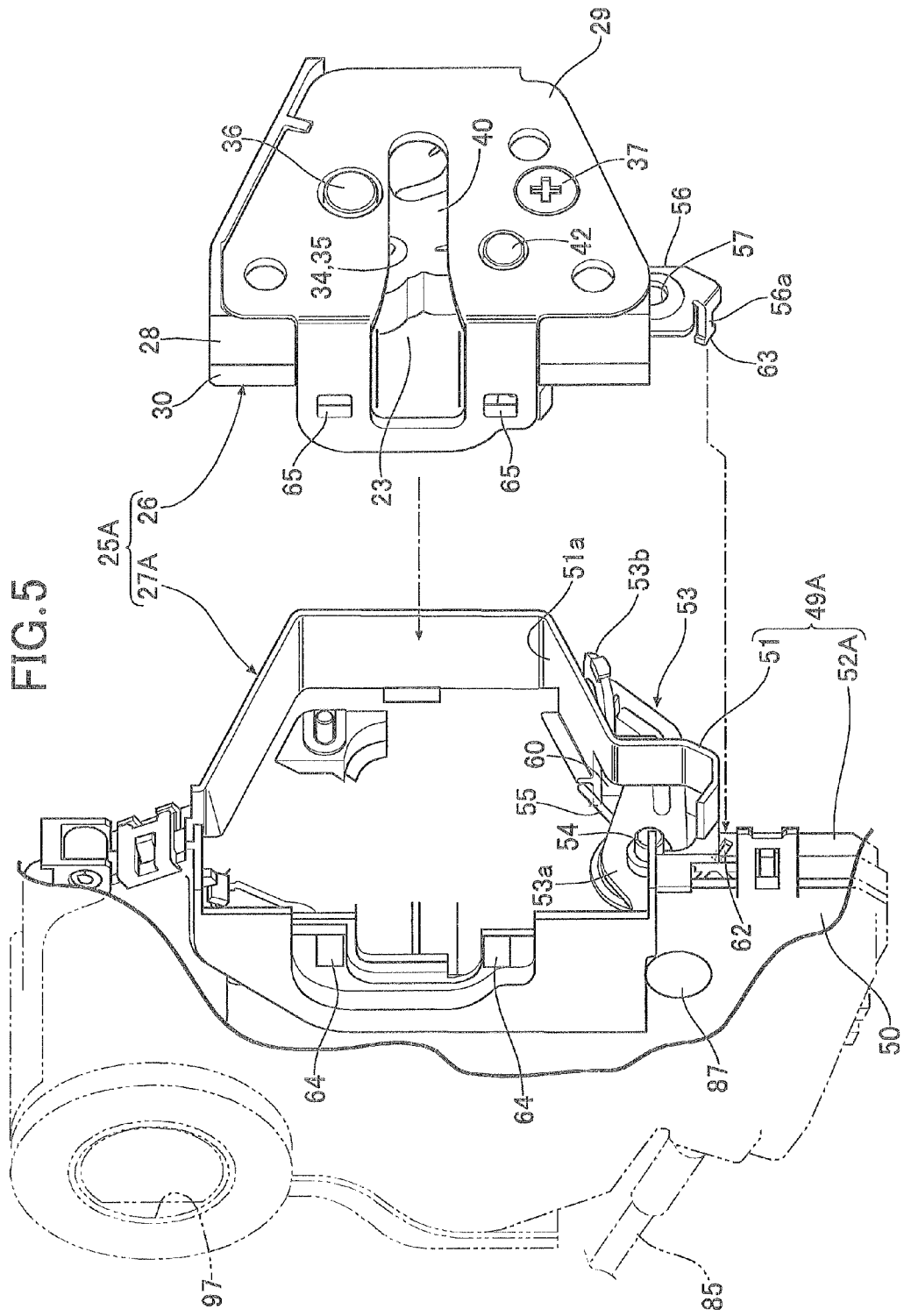
FIG. 5 is an exploded perspective view of a latch mechanism and a lock/unlock switching mechanism. (first embodiment)

Referring in addition to FIG. 5, the second case 27A, which houses the lock/unlock switching mechanism 24, is formed by joining to each other a housing case 49A made of a synthetic resin and a cover 50 made of a synthetic resin. The housing case 49A has a substantially L-shaped form integrally having a latch mechanism housing part 51 formed into a box shape while forming a housing recess 51a housing the first case 26, and a lock/unlock switching mechanism housing part 52 rising from the latch mechanism housing part 51 so as to house the lock/unlock switching mechanism 24, and the cover 50 is joined to the housing case 49A so as to cover the lock/unlock switching mechanism housing part 52 of the housing case 49A. The first case 26 is thus mounted on the second case 27A so that its back plate 30 is covered by the housing case 49A of the second case 27A.

An open lever 53 disposed beneath the latch mechanism 23 so as to pivot in response to the outside handle inputting a door opening operation force is pivotably supported by a support shaft 54 having an axis parallel to the pivot axes of the latch 40, the ratchet 41, and the ratchet lever 43 of the latch mechanism 23 and having a base end part thereof fixedly provided on the second case 27A; in this embodiment, the support shaft 54 is provided integrally with the latch mechanism housing part 51 of the housing case 49A in the second case 27A. Furthermore, a return spring 55 is provided between the housing case 49A in the second case 27A of the casing 25A and the open lever 53.

On the other hand, the back plate 30 of the first case 26 is provided integrally with a shaft support part 56 protruding to one side (downward in this embodiment) from the case main body 28 of the first case 26, and a bearing hole 57 that an extremity part of the support shaft 54 is fitted into and supported by is provided in the shaft support part 56. Furthermore, the housing case 49A is provided with an annular wall 59 coaxially surrounding the support shaft 54 while forming an annular groove 58 between the annular wall 59 and the support shaft 54.

Figure 6:
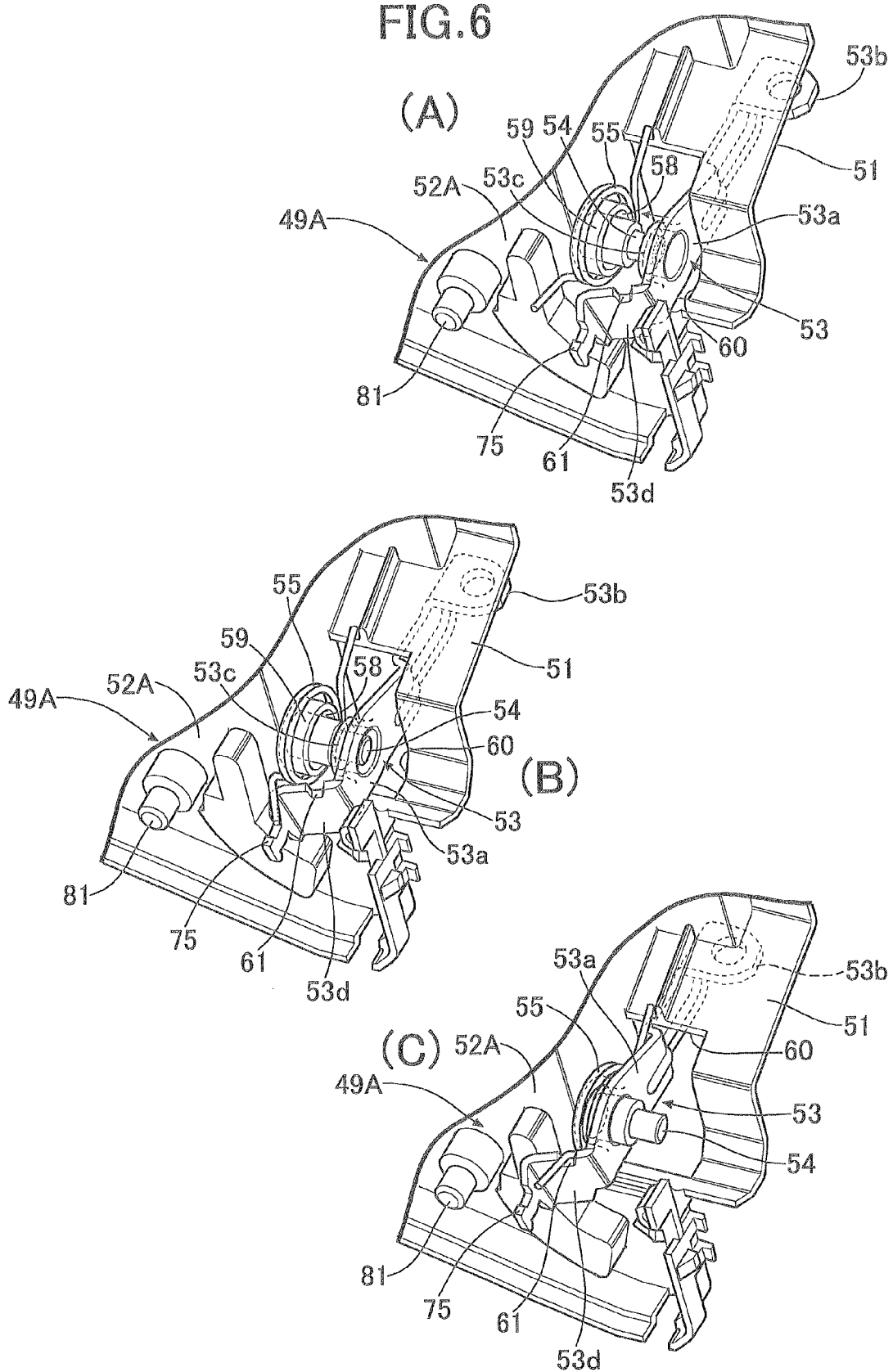
FIG. 6 is a perspective view, in the vicinity of an open lever, showing in sequence the steps of assembling the open lever. (first embodiment)

Referring in addition to FIG. 6, the open lever 53 integrally has a lever main portion 53a formed substantially along a plane perpendicular to the axis of the support shaft 54, a cable link portion 53b provided at one end of the lever main portion 53a so that a cable for transmitting a door opening operation force from the outside handle is linked thereto, a cylindrical support tube portion 53c integrally connected at right angles to the lever main portion 53a so as to have the support shaft 54 inserted thereinto and so as to be fitted pivotably into the annular groove 58, and a latching plate portion 53d having its base end part integrally connected to the other end part of the lever main portion 53a so that the support shaft 54 is interposed between itself and the cable link portion 53b; the latching plate portion 53d extends from the lever main portion 53a to the interior of the second case 27A along another plane that obliquely intersects the plane along which the lever main portion 53a substantially extends.

Furthermore, an opening 60 is provided in the latch mechanism housing part 51 of the housing case 49A of the second case 27A, one end of the lever main portion 53a of the open lever 53 projecting toward the outer face of the door D through the opening 60, and the cable link portion 53b is disposed outside the casing 25A.

The return spring 55 provided between the housing case 49A and the open lever 53 is formed into a coil shape surrounding the annular wall 59, and the latching plate portion 53d of the open lever 53 is disposed outside the return spring 55. One end part of this return spring 55 is latched on the housing case 49A at the edge of the opening of the opening 60, and the other end part of the return spring 55 is latched in a latching groove 61 provided in the edge on one side of an intermediate part of the latching plate portion 53d.

When assembling the open lever 53, first, as shown in FIG. 6 (A), in a state in which the return spring 55 is provisionally assembled on the housing case 49A side so as to surround the annular wall 59 and have one end part latched on the housing case 49A, an extremity part of the support shaft 54 is inserted into the support tube portion 53c of the open lever 53 so as to make the cable link portion 53b project outward from the opening 60; subsequently, as shown in FIG. 6 (B) if the open lever 53 is pushed until the other end part of the return spring 55 latches on the edge of the latching plate portion 53d of the open lever 53, and the open lever 53 is pushed further until the support tube portion 53c is fitted into the annular groove 58, the other end part of the return spring 55 is latched by the latching groove 61 guided by the edge of the latching plate portion 53d.

Referring to FIG. 3 and FIG. 5, a support arm portion 56a is integrally connected to the shaft support part 56 integrally provided with the back plate 30 of the first case 26, the support arm portion 56a extending in a direction substantially parallel to the support shaft 54, and this support arm portion 56a is disposed at a position that determines the pivoting limit of the open lever 53 urged by the return spring 55 in a state in which the door opening operation force is being inputted, and restricts the pivoting limit of the open lever 53 by abutting against the other end of the lever main portion 53a of the open lever 53 in the state in which the door opening operation force is being inputted.

Furthermore, the extremity of the support arm portion 56a is integrally provided with an engagement claw 63 that resiliently engages with an engagement hole 62 provided in the latch mechanism housing part 51 of the housing case 49A of the second case 27A. In addition, the cover plate 29 of the first case 26 is provided with a pair of engagement holes 65 and 65 positioned at opposite sides of the approach groove 34, a pair of engagement projections 64 and 64 provided on the cover 50 of the second case 27A resiliently engaging with the pair of engagement holes 65 and 65, and one screw member 66 (see FIG. 3) inserted through the latch mechanism housing part 51 of the housing case 49A of the second case 27A is screwed into the back plate 30 of the first case 26.

That is, the first case 26 is mounted on the second case 27A by virtue of resilient engagement of the engagement claw 63 with the engagement hole 62, resilient engagement of the two engagement projections 64 with the two engagement holes 65, and securing by one screw member 66.

Figure 7:
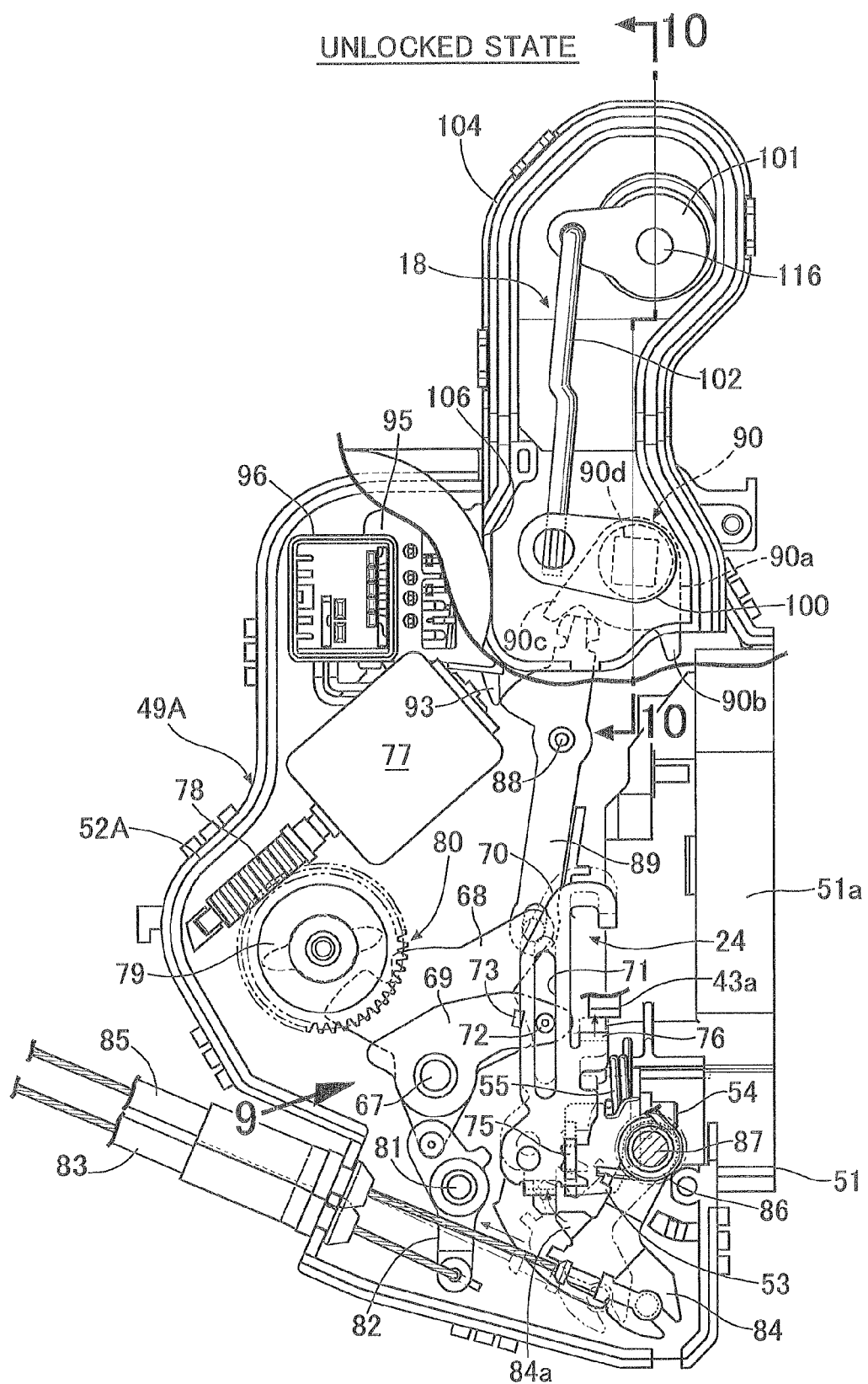
FIG. 7 is a view, from the same direction as in FIG. 2, omitting part of a casing and an extension case when the lock/unlock switching mechanism is in an unlocked state. (first embodiment)
Figure 8:
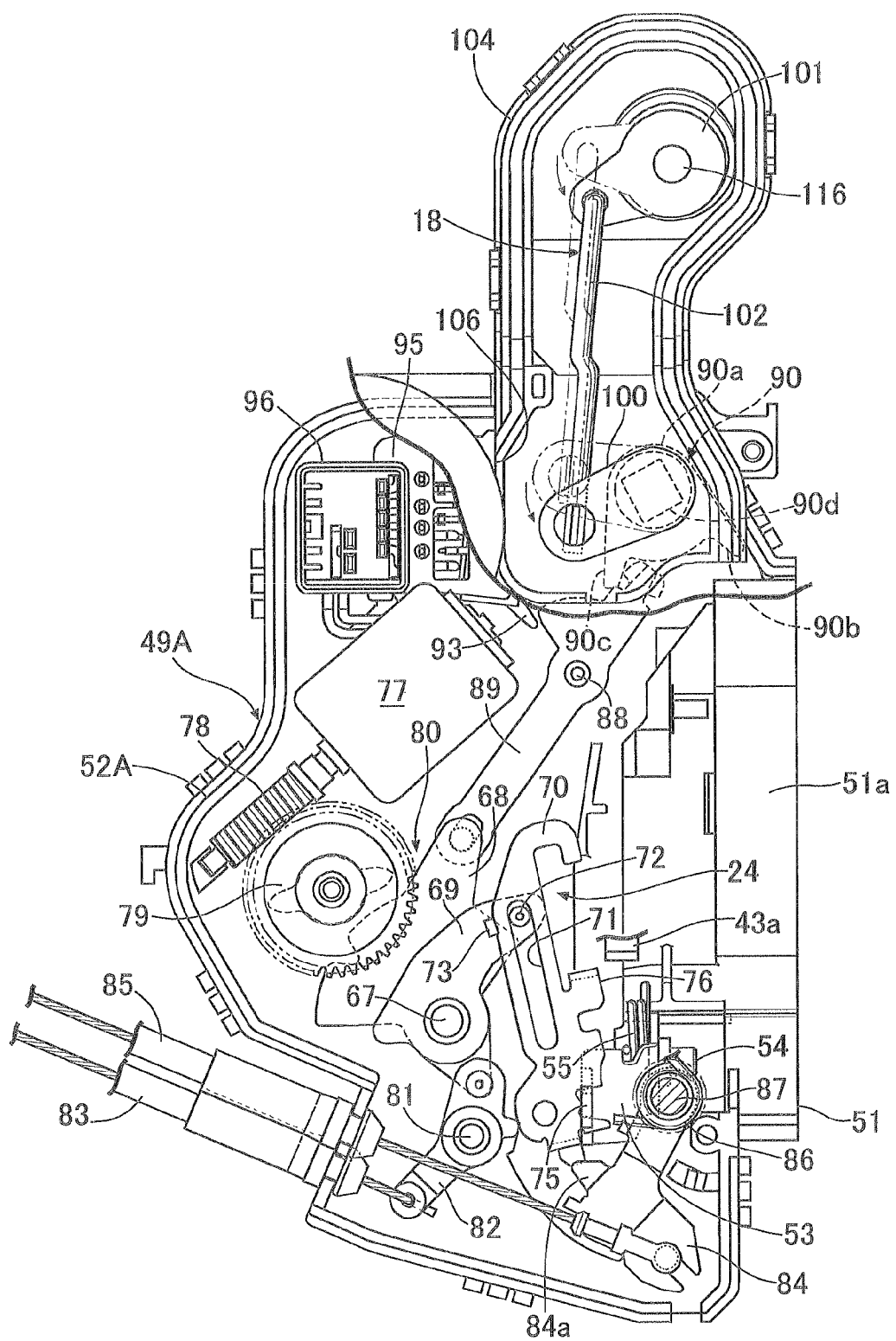
FIG. 8 is a view, from the same direction as in FIG. 2, omitting part of the casing and the extension case when the lock/unlock switching mechanism is in a locked state. (first embodiment)

In FIG. 7 and FIG. 8, the lock/unlock switching mechanism 24 switches between a state in which the unlocking operation force is inputted into the input arm portion 43a of the ratchet lever 43 of the latch mechanism 23 in response to pivoting of the open lever 53 and a state in which inputting of the unlocking operation force into the input arm portion 43a of the ratchet lever 43 is disabled in spite of pivoting of the open lever 53, and includes a switch power input member 68 pivotably supported on a shaft 67 provided on the housing case 49A, a locking lever 69 superimposed on the switch power input member 68 and pivotably supported on the shaft 67, and an open link 70 linked to the locking lever 69 and the open lever 53, the locking lever 69 engaging with the switch power input member 68 so as to pivot together with the switch power input member 68.

The open link 70 can move linearly accompanying pivoting of the open lever 53; a long hole 71 extending along the direction of linear movement is provided in the open link 70, a pin 72 is provided at a position, offset from the axis of the shaft 67, of the locking lever 69, the pin 72 being inserted through the long hole 71, and in addition a suppressing projection 73 is projectingly provided for suppressing rattling of the open link 70 by sandwiching the open link 70 between itself and the pin 72.

Figure 9:
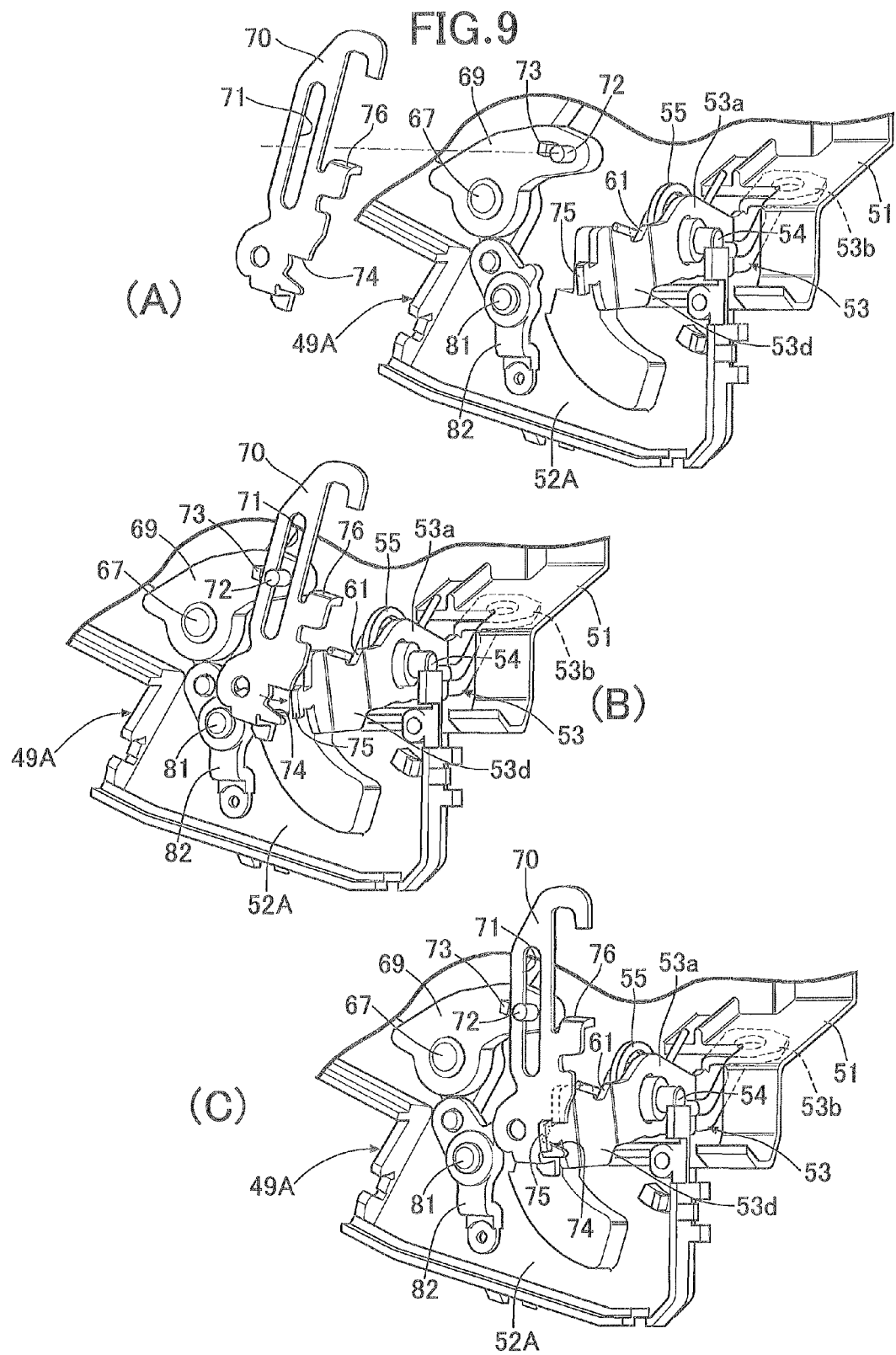
FIG. 9 is a perspective view from the direction of arrow 9 in FIG. 7 showing in sequence the steps of linking a locking lever and the open lever. (first embodiment)

Referring in addition to FIG. 9, one end part of the open link 70 is pivotably linked to the open lever 53 so that the open link 70 moves linearly accompanying pivoting of the open lever 53, and a link-side linking part 74 provided at the one end part of the open link 70 detachably engages with a lever-side linking part 75 provided on the open lever 53 so that the open link 70 can pivot.

The lever-side linking part 75, which has a substantially T-shaped form, is projectingly provided integrally with the extremity of the latching plate portion 53d of the open lever 53, and the link-side linking part 74 is formed recessed into the one end part of the open link 70 so that the lever-side linking part 75 can be inserted into and engaged therewith.

When pivotably linking the one end part of the open link 70 to the open lever 53, first, as shown in FIG. 9 (A), the open lever 53 and the locking lever 69 are supported on the housing case 49A of the casing 25, then as shown in FIG. 9 (B) the pin 72 of the locking lever 69 is inserted into the long hole 72 of the open link 70, the open link 70 is interposed between the pin 72 and the suppressing projection 73 of the locking lever 69 and, furthermore, as shown in FIG. 9 (C), by pivoting the open link 70 around the axis of the pin 72 the link-side linking part 74 provided on the one end part of the open link 70 is detachably engaged with the lever-side linking part 75 provided on the open lever 53.

Moreover, as a result of the lever-side linking part 75 of the open lever 53 being pivotably engaged with the link-side linking part 74 of the open link 70, the open link 70 can pivot between an unlocking enabled attitude (attitude shown in FIG. 7) in which linear movement in response to pivoting of the open lever 53 enables an unlocking operation force to be inputted into the input arm portion 43a of the ratchet lever 43 of the latch mechanism 23 and an unlocking disabled attitude (attitude shown in FIG. 8) in which linear movement in response to pivoting of the open lever 53 does not enable an unlocking operation force to be inputted into the input arm portion 43a of the ratchet lever 43 of the latch mechanism 23, and as a result of pivoting of the locking lever 69 and then pivoting of the pin 72 around the axis of the shaft 67 the attitude of the open link 70 changes between the unlocking enabled attitude and the unlocking disabled attitude.

That is, the open link 70 is provided with a pressing part 76 that opposes, in the direction of linear movement of the open link 70, the input arm portion 43a of the ratchet lever 43 when in the unlocking enabled attitude, and when the open link 70 is in the unlocking disabled attitude this pressing part 76 is in a position in which, even when the open link 70 moves linearly, it only passes through a position displaced toward one side of the input arm portion 43a and cannot input an unlocking operation force into the input arm portion 43a.

A reversible electric motor 77 is housed within the second case 27A of the casing 25A so as to be fixed to the housing case 49A of the second case 27A, power transmitting means 80 is provided between this electric motor 77 and the switch power input member 68, the power transmitting means 80 including a worm gear 78 provided on a main shaft of the electric motor 77 and a worm wheel 79 meshing with the worm gear 78 so as to be able to pivot around an axis that is parallel to the pivot axis of the switch power input member 68, and this power transmitting means 80 is arranged so that power can be transmitted from the electric motor 77 to the switch power input member 68 but power cannot be transmitted from the switch power input member 68 toward the electric motor 77 side.

The electric motor 77 is used in a smart key system, and in accordance with the use of a smart key, the unlocking enabled attitude and the unlocking disabled attitude of the open link 70 can be automatically switched by operation of the electric motor 77.

Furthermore, a lower part of the switch power input member 68 has one end of a knob lever 82 linked thereto, the knob lever 82 being pivotably supported on the housing case 49A via a shaft 81 that is disposed beneath the shaft 67 and has an axis parallel to the shaft 67, and the other end of this knob lever 82 has linked thereto a push/pull cable 83 that transmits an operating force of a locking knob (not illustrated) provided on the inner face of the door D on the vehicle compartment side. By operating the locking knob the switch power input member 68 and the locking lever 69 are pivoted via the knob lever 82, thereby also changing the attitude of the open link 70 between the unlocking enabled attitude and the unlocking disabled attitude.

An input lever 84 is pivotably supported on the cover 50 of the second case 27A in the vicinity of the open lever 53 via a shaft 87 that has an axis perpendicular to the pivot axis of the open lever 53, and this input lever 84 is provided with a pressing part 84a that can abut against the one end part of the open link 70 and push the open link 70. Moreover, the input lever 84 has linked thereto a push/pull cable 85 that transmits an operating force of an inside handle (not illustrated) provided on the inner face of the door D on the vehicle compartment side. In accordance with operation of the inside handle, the input lever 84 pivots so that the pressing part 84a pushes the open link 70, and a torsion spring 86 is provided between the cover 50 and the input lever 84, the torsion spring 86 urging the input lever 84 toward the side that releases the force pressing the open link 70.

Furthermore, an upper part of the switch power input member 68 has linked thereto one end of a locking control lever 89 pivotably supported on the housing case 49A via a shaft 88 having an axis parallel to the shaft 67 and disposed above the shaft 67, and a pivoting power is inputted into the other end of the locking control lever 89 from a cylinder lever 90, which is an input pivot member.

Figure 10:
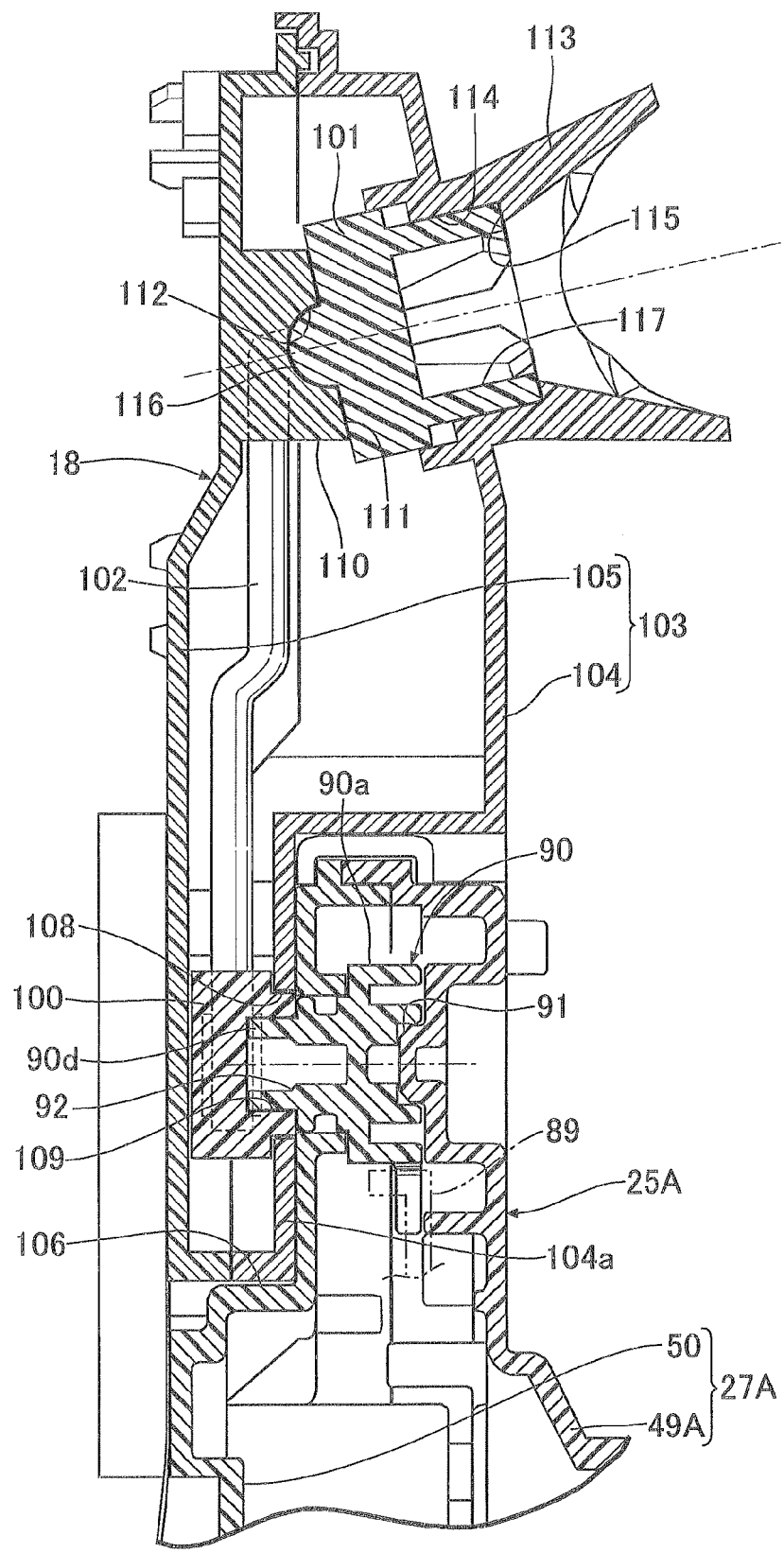
FIG. 10 is an enlarged sectional view along line 10-10 in FIG. 7. (first embodiment)

Referring in addition to FIG. 10, the cylinder lever 90 integrally has a pivot base 90a, a pair of pressing arm portions 90b and 90c, and a link shaft portion 90d, the pivot base 90a being supported on the second case 27A so as to be pivotably supported by a support projection 91 provided on the housing case 49A of the second case 27A of the casing 25A and be pivotably fitted into a support hole 92 provided in the cover 50 of the second case 27A so as to correspond to the support projection 91, the pair of pressing arm portions 90b and 90c being projectingly provided at two positions spaced in the peripheral direction of the pivot base 90a and sandwiching the other end of the locking control lever 89 from opposite sides, the link shaft portion 90d being connected coaxially to a central part of the pivot base 90a so as to project from the cover 50 of the second case 27A, and the link shaft portion 90d being formed so as to have a noncircular cross-sectional shape, for example, a rectangular shape.

As a result of the cylinder lever 90 pivoting, the other end of the locking control lever 89 is pushed by one of the two pressing arm portions 90b and 90c, thereby pivoting the locking control lever 89, and as a result of the locking control lever 89 pivoting, the switch power input member 68 and the locking lever 69 pivot, and this also changes the attitude of the open link 70 between the unlocking enabled attitude and the unlocking disabled attitude.

Referring to FIG. 7 and FIG. 8, a switch assembly unit 95 is fixed to the housing case 49A of the second case 27A of the casing 25A at a position in the vicinity of the electric motor 77, the switch assembly unit 95 including a position detection switch 93 that can switch a switching mode in response to pivoting of the locking control lever 89 and a switch (not illustrated) for detecting a pivot position of the cylinder lever 90; this switch assembly unit 95 is integrally provided with the position detection switch 93, etc. and a connector 96 connected to the electric motor 77, and a circular connector connection hole 97 (see FIG. 2) is provided in the cover 50 of the second case 27A of the casing 25A, the connector 96 facing the connector connection hole 97.

Figure 11:
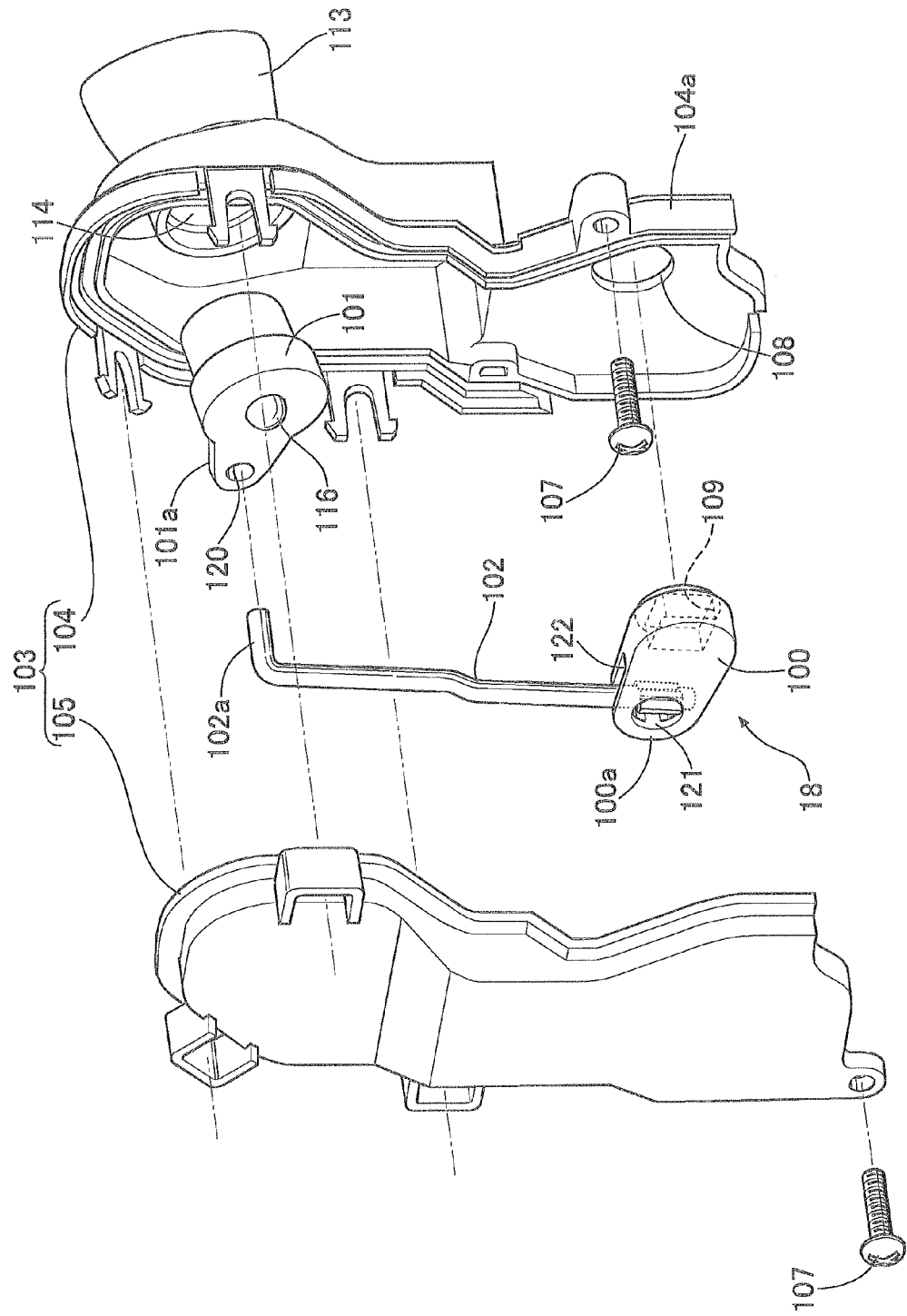
FIG. 11 is an exploded perspective view of pivoting force transmission means. (first embodiment)

Referring in addition to FIG. 11, the pivoting force transmission means 18 is formed by housing a driven-side pivot member 100, a drive-side pivot member 101, and a transmission rod 102 within an extension case 103, the driven-side pivot member 100 being coaxially and detachably linked to the link shaft portion 90d of the cylinder lever 90 in a relatively non-pivotable manner, the drive-side pivot member 101 having an axis parallel to the pivot axis of the driven-side pivot member 100, being disposed at a position spaced from the driven-side pivot member 100, and being coaxially and detachably linked to the other end part of the pivot rod 17 in a relatively non-pivotable manner, the transmission rod 102 being a transmission member provided between the drive-side and driven-side pivot members 101 and 100 so as to transmit a pivoting force from the drive-side pivot member 101 to the driven-side pivot member 100, and the extension case 103 pivotably supporting the driven-side pivot member 100 and the drive-side pivot member 101.

The extension case 103 is formed by joining first and second case halves 104 and 105 to each other, and is detachably mounted on the second case 27A of the casing 25A so as to extend upward from the second case 27A.

The second case half 105 is formed so that it is flat overall, whereas the first case half 104 is formed so as to have a flat portion 104a in its lower part. On the other hand, a recess 106 into which a lower part of the extension case 103 is fitted is formed in an upper part of the cover 50 of the second case 27A, and the lower part of the extension case 103 is fitted into the recess 106 so that the flat portion 104a of the first case half 104 is superimposed on the cover 50, and is fixed to the second case 27A by means of, for example, a pair of screw members 107 and 107. Opposite faces of the extension case 103 are substantially flush with opposite faces of the second case 27A in a state in which the extension case 103 is fixed to the second case 27A.

A support hole 108 is provided in the flat portion 104a of the first case half 104, the support hole 108 corresponding to the support hole 92 provided in the cover 50 of the second case 27A, and the driven-side pivot member 100 is fitted into and supported by the support hole 108. Moreover, the driven-side pivot member 100 is provided with a link recess 109, the link shaft portion 90d of the cylinder lever 90 being relatively non-pivotably fitted into the link recess 109.

A support projection 110 is projectingly provided integrally with an inner face of an upper part of the second case half 105, a flat support plane 111 is formed at the projecting end of this support projection 110, and a semicircular support recess 112 is formed in a central part of the support plane 111. Furthermore, a guide tube 113 having an axis perpendicular to the support plane 111 is integrally provided with an upper part of the first case half 104 so that opposite ends thereof open, and an inner end side of this guide tube 113 is provided with a fitting support hole 114 and a step 115, the drive-side pivot member 101 having one end in sliding contact with the support plane 113 and the other end side pivotably fitted into the fitting support hole 114, the step 115 being connected to the outer end of the fitting support hole 114 while having the other end of the drive-side pivot member 101 in sliding contact therewith, a semicircular projection 116 being projectingly provided at one end of the drive-side pivot member 101, and the projection 116 being fitted into the support recess 112.

The drive-side pivot member 101 is pivotably supported by the upper part of the extension case 103, a link recess 117 that opens outward within the guide tube 113 is provided in the drive-side pivot member 101 so as to have a noncircular cross-sectional shape, and the other end part of the pivot rod 17 is relatively non-pivotably fitted into the link recess 117, the pivot rod 17 transmitting a pivoting force in response to a key operation of the cylinder lock 15.

The driven-side pivot member 100 and the drive-side pivot member 101 are provided with link arm portions 100a and 101a respectively, and opposite end parts of the transmission rod 102 engage with the link arm portion 101a of the drive-side pivot member 101 and the link arm portion 100a of the driven-side pivot member 100.

One of the link arm portion 101a of the drive-side pivot member 101 and the link arm portion 100a of the driven-side pivot member 100, in this embodiment the link arm portion 101a of the drive-side pivot member 101, is provided with a first engagement hole 120, and the other of the link arm portion 101a of the drive-side pivot member 101 and the link arm portion 100a of the driven-side pivot member 100, in this embodiment the link arm portion 100a of the driven-side pivot member 100, is provided with a second engagement hole 121 having an axis parallel to the first engagement hole 120 and an insertion hole 122 intersecting an intermediate part of the second engagement hole 121 at right angles.

Figure 12:
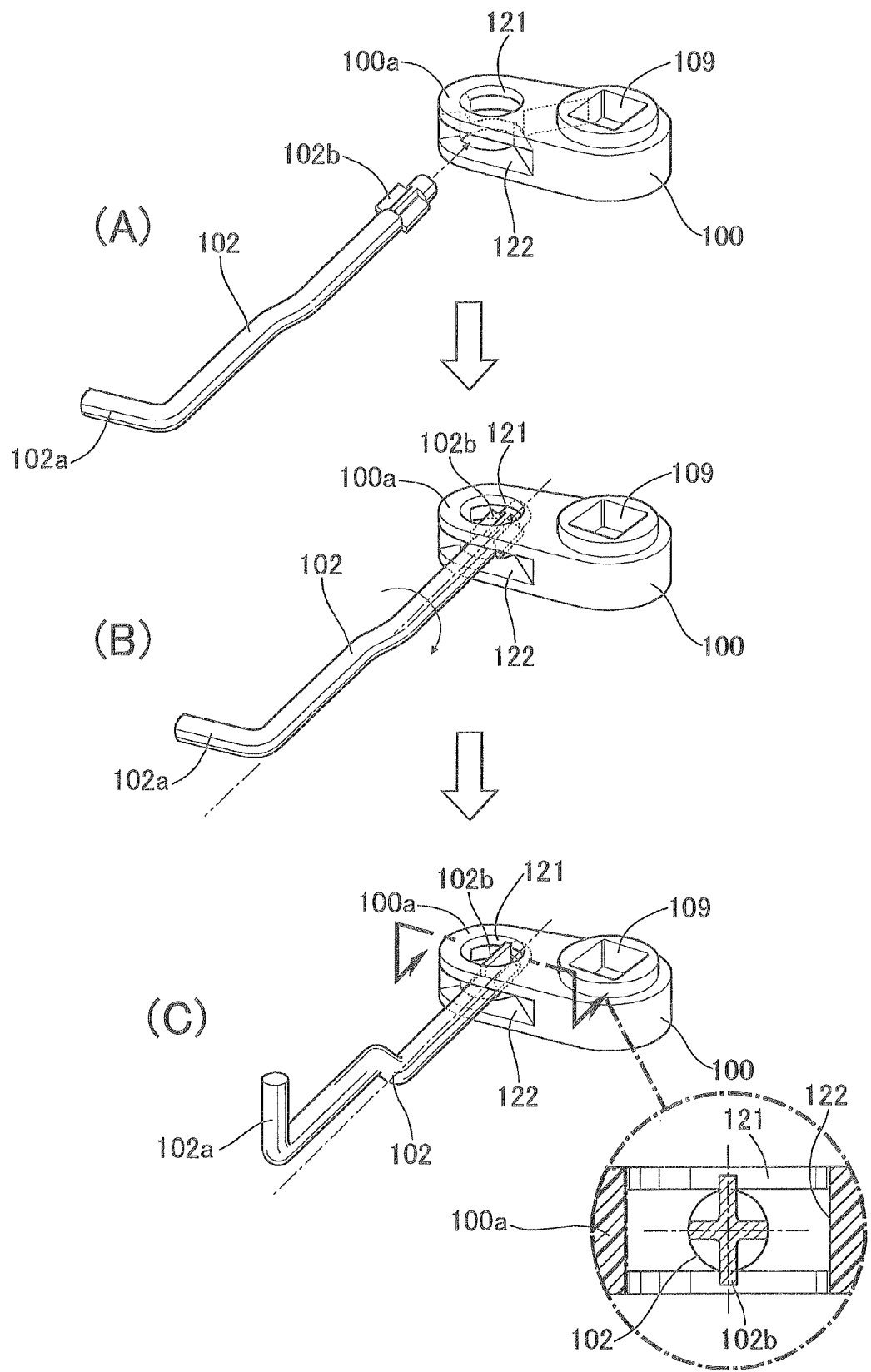
FIG. 12 is a perspective view showing in sequence the steps of linking a transmission rod to a driven-side pivot member. (first embodiment)

Referring in addition to FIG. 12, a rod-shaped first engagement portion 102a that is detachably engaged with the first engagement hole 120 is integrally provided so as to be connected at right angles to one end part of the transmission rod 102, and a second engagement portion 102b that is detachably engaged with the second engagement hole 121 is integrally provided with the other end part of the transmission rod 102.

The second engagement portion 102b is formed along one diameter of the transmission rod 102 by flattening one part of the transmission rod 102 at the other end from the first engagement portion 102a, and opposite ends of the second engagement portion 102b project sideways from the outer periphery of the transmission rod 102 when viewed from a direction along the axis of the transmission rod 102. Moreover, the second engagement portion 102b is formed so that it can be inserted into the insertion hole 122 when as shown in FIG. 12 (A) the transmission rod 102 is in a first attitude in which the first engagement portion 102a is disposed on a plane that is perpendicular to the axes of the first and second engagement holes 120 and 121 and so that it engages with the second engagement hole 121 when the transmission rod 102 in a state as shown in FIG. 12 (B) in which the second engagement portion 102b is inserted into the insertion hole 122 is put in a second attitude as shown in FIG. 12 (C) in which the transmission rod 102 is pivoted by 90 degrees from the first attitude.

The operation of this embodiment is now explained. The casing 25A of the door lock device 16A is formed by mounting the first case 26, which is formed by interposing, between the metal cover plate 29 and back plate 30, the case main body 28 formed into a box shape from a synthetic resin so that the latch mechanism 23 can be inserted, on the synthetic resin second case 27A, which houses the lock/unlock switching mechanism 24 that can switch between a state in which an unlocking operation force is inputted into the latch mechanism 23 in response to pivoting of the open lever 53 that pivots in response to a door opening operation force being inputted and a state in which inputting of an unlocking operation force into the latch mechanism 23 is disabled regardless of pivoting of the open lever 53, so that the back plate 30 is covered by the second case 27A; the base end part of the support shaft 54 pivotably supporting the open lever 53 is fixedly provided on the housing case 49A of the second case 27A; and the bearing hole 57 that the extremity part of the support shaft 54 is fitted into and supported by is provided on the shaft support part 56 integrally provided with the back plate 30 so as to protrude to one side from the case main body 28.

Therefore, the synthetic resin support shaft 54 having its base end part fixedly provided on the housing case 49A of the second case 27A has its extremity part fitted into and supported by the bearing hole 57 of the shaft support part 56, which is made of metal, thereby increasing the support strength of the support shaft 54.

Furthermore, since the engagement claw 63 resiliently engaging with the housing case 49A of the second case 27A is provided at the extremity of the support arm portion 56a integrally connected to the shaft support part 56 so as to extend in a direction substantially parallel to the support shaft 54, the back plate 30 of the first case 26 and the second case 27A are linked in the area around the link support shaft 54, the support strength of the support shaft 54 can be increased, and it becomes possible to prevent any deformation of the support shaft 54 due to an operating force being inputted into the open lever 53, thus preventing the support shaft 54 from rattling or falling out.

Moreover, since the support arm portion 56a is disposed at a position in which it abuts against the open lever 53 so as to determine the pivoting limit for the open lever 53 in the door opening operation force inputted state, the pivoting limit of the open lever 53 in the operation force inputted state can be restricted by the support arm portion 56a, thus making it unnecessary to provide a special restricting part for restricting the pivoting limit of the open lever 53.

The lock/unlock switching mechanism 24 includes the open link 70, which has one end part linked to the open lever 53 so that linear movement in response to pivoting of the open lever 53 is enabled, and the return spring 55, which urges the open lever 53 toward the side that puts the open link 70 in a non-operating position; since the housing case 49A of the second case 27A of the casing 25A is provided with the support shaft 54 and the annular wall 59 coaxially surrounding the support shaft 54 so as to form the annular groove 58 between itself and the support shaft 54, the cylindrical support tube portion 53c having the support shaft 54 inserted thereinto is provided on the open lever 53 so as to be pivotably fitted into the annular groove 58, and the return spring 55 provided between the housing case 49A and the open lever 53 is formed into a coil shape surrounding the annular wall 59, it is possible to assemble the open lever 53 and the return spring 55 by fitting the support tube portion 53c into the annular groove 58 between the support shaft 54 and the annular wall 59 and inserting the support shaft 54 into the support tube portion 53c in a state in which the coil-shaped return spring 55 is disposed so as to surround the annular wall 49 while one end part thereof is latched on the housing case 49A to thus assemble the open lever 54 on the housing case 49A, and then latching the other end part of the return spring 55 on the open lever 53, thus making assembly of the return spring 55 easy.

Furthermore, since the open lever 53 integrally includes the lever main portion 53a, which is formed substantially along the plane perpendicular to the axis of the support shaft 54, the support tube portion 53c, which has its base end part connected to the lever main portion 53a, and the latching plate portion 53d, which is disposed outside the return spring 55 and is connected to the lever main portion 53a so as to follow the other plane that intersects the above plane, and the latching groove 61 in which the other end part of the return spring 55 latches is provided on one edge of the intermediate part of the latching plate portion 53d, when the open lever 53 is assembled on the housing case 49A by inserting the support shaft 54 into the support tube portion 53c, by abutting the other end part of the return spring 55 against the edge of the latching plate portion 53d the other end part of the return spring 55 automatically latches in the latching groove 61 as a result of assembly of the open lever 53 on the housing case 49A, thus making assembly of the return spring 55 easy.

Furthermore, the open link 70 is provided with the long hole 71, which enables linear movement accompanying pivoting of the open lever 53 and extends along the direction of linear movement, and has one end part pivotably linked to the open lever 53 so as to pivot between the unlocking enabled attitude, in which inputting of the unlocking operation force into the latch mechanism 23 due to the linear movement is enabled, and the unlocking disabled attitude, in which inputting of the unlocking operation force into the latch mechanism 23 due to the linear movement is disabled, the locking lever 69 is pivotably supported on the housing case 49A of the second case 27A of the casing 25A, and the pin 72 inserted through the long hole 71 is provided on the locking lever 69. The attitude of the open link 70 is switched between the unlocking enabled attitude and the unlocking disabled attitude in response to pivoting of the locking lever 69.

Since the link-side linking part 74 provided at the one end part of the open link 70 and the lever-side linking part 75 provided on the open lever 53 are formed so that the link-side linking part 74 is detachably engaged with the lever-side linking part 75 in response to pivoting of the open link 70 with the pin 72 as a center and the open link 70 can pivot between the unlocking enabled attitude and the unlocking disabled attitude in this engaged state, in a state in which the open lever 53 and the locking lever 69 are supported on the second case 27A of the casing 25A the pin 72 provided on the locking lever 69 is inserted into the long hole 71 of the open link 70, and the open link 70 is pivoted around the axis of the pin 72, thus allowing the link-side linking part 74 provided on the one end part of the open link 70 to detachably engage with the lever-side linking part 75 provided on the open lever 53, and in this engaged state the open link 70 can pivot to switch between the unlocking enabled attitude and the unlocking disabled attitude, thereby making the operation of linking the one end part of the open link 70 to the open lever 53 very easy.

Furthermore, the pivoting force of the rotor 21 pivoting in response to a key operation of the cylinder lock 15 mounted on the outer face of the door D is transmitted to the cylinder lever 90 of the door lock device 16A via the pivot rod 17, which has one end part relatively non-pivotably linked to the rotor 21, and the pivoting force transmission means 18; the pivoting force transmission means 18 is formed by housing the driven-side pivot member 100, which is coaxially and detachably linked to the cylinder lever 90 of the lock/unlock switching mechanism 24 of the door lock device 16A in a relatively non-pivotable manner, the drive-side pivot member 101, which is disposed at a position spaced from and above the driven-side pivot member 100 and coaxially and detachably linked to the other end part of the pivot rod 17 in a relatively non-pivotable manner while having an axis parallel to the pivot axis of the driven-side pivot member 100, and the transmission rod 102, which is provided between the drive-side and driven-side pivot members 101 and 100 so as to transmit a pivoting force from the drive-side pivot member 101 to the driven-side pivot member 100, within the extension case 103 pivotably supporting the driven-side pivot member 100 and the drive-side pivot member 101; and the extension case 103 is detachably mounted on the casing 25A of the door lock device 16A so as to extend from the casing 25A.

Therefore, by preparing the pivoting force transmission means 18, which corresponds to the relative positions of the cylinder lock 15 and the lock/unlock switching mechanism 24 of the door lock device 16A, it becomes possible to transmit a pivoting force from the cylinder lock 15 to the cylinder lever 90 of the lock/unlock switching mechanism 24 via the pivot rod 17, and it is possible to increase the degree of freedom in layout of the lock/unlock switching mechanism 24 of the door lock device 16A with respect to the cylinder lock 15.

Moreover, the extension case 103 of the pivoting force transmission means 18 is detachably mounted on the casing 25A of the door lock device 16A, changes in relative position between the cylinder lock 15 and the lock/unlock switching mechanism 24 can be dealt with by the pivoting force transmission means 18, and the lock/unlock switching mechanism 24 can be one and the same, thus avoiding any increase in the dimensions of the lock/unlock switching mechanism 24.

Figure 13:
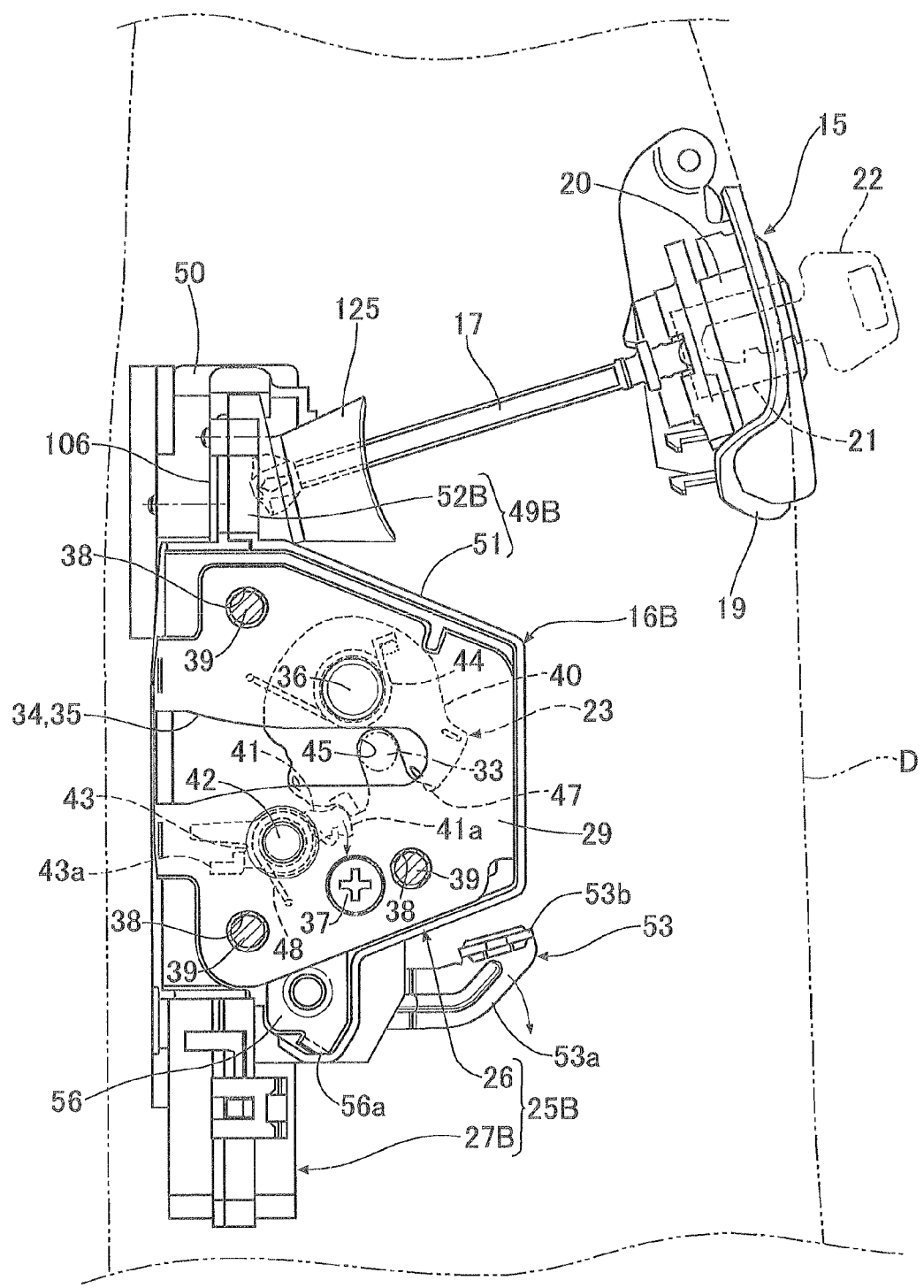
FIG. 13 is a side view, corresponding to FIG. 1, of a case in which pivoting force transmission means is unnecessary. (first embodiment)

As shown in FIG. 13, when a door lock device 16B is mounted on a door D so as to substantially correspond to a cylinder lock 15, among a housing case 49B forming a second case 27B of a casing 25B of the door lock device 16B together with a cover 50, a guide tube 125 need only be provided on a lock/unlock switching mechanism housing part 52B so as to correspond to a cylinder lever 90 housed in the lock/unlock switching mechanism housing part 52B (see FIG. 7 and FIG. 8), and the transmission rod 17 may be relatively non-pivotably linked to the cylinder lever 90 within the guide tube 125.

Furthermore, since the drive-side pivot member 101 and the driven-side pivot member 100 are provided with the link arm portions 101a and 100a respectively, and opposite end parts of the transmission rod 102 are engaged with the two link arm portions 101a and 100a, the arrangement of the pivoting force transmission means 18 can be simplified, and changes in relative position of the cylinder lock 15 and the lock/unlock switching mechanism 24 can be dealt with easily by changes in the length of the transmission rod 102.

Moreover, the first engagement hole 120 is provided in the link arm portion 101a of one of the drive-side and driven-side pivot members 101 and 100 (in this embodiment the drive-side pivot member 101), the second engagement hole 121 having an axis parallel to the first engagement hole 120 and the insertion hole 122 intersecting the intermediate part of the second engagement hole 121 at right angles are provided in the link arm portion 100a of the other of the drive-side and driven-side members 101 and 100 (in this embodiment the driven-side pivot member 100), the rod-shaped first engagement portion 102a detachably engaged with the first engagement hole 120 is provided integrally with one end part of the transmission rod 102 so as to be connected at right angles, the second engagement portion 102b detachably engaged with the second engagement hole 121 is provided integrally with the other end part of the transmission rod 102, and the second engagement portion 102b is formed so that it can be inserted into the insertion hole 122 when the transmission rod 102 is in the first attitude in which the first engagement portion 102a is disposed on the plane perpendicular to the axes of the first and second engagement holes 120 and 121 and it engages with the second engagement hole 121 when the transmission rod 102 in a state in which the second engagement portion 102b is inserted into the insertion hole 122 is put in the second attitude in which the transmission rod 102 is pivoted by 90 degrees from the first attitude.

Therefore, after the second engagement portion 102b is inserted into the insertion hole 122 in a state in which the transmission rod 102 is in the first attitude, putting the transmission rod 102 in the second attitude enables the second engagement portion 102b of the transmission rod 102 to be engaged with the link arm portion 100a of the driven-side pivot member 100. Moreover, in a state in which the drive-side and driven-side pivot members 101 and 100 are linked to each other by the transmission rod 102, detachment of the first engagement portion 102a on one end part of the transmission rod 102 from the first engagement hole 120 is prevented by the second engagement portion 102b being inserted into the insertion hole 122, and changing of the attitude of the transmission rod 102 from the second attitude to the first attitude in order to detach the second engagement portion 102b on the other end part of the transmission rod 102 from the second engagement hole 121 is prevented by the first engagement portion 102a being inserted into and engaged with the first engagement hole 120; it is therefore unnecessary to employ any special component for preventing the transmission rod 102 from detaching from the drive-side and driven-side pivot members 101 and 100, thereby enabling a state in which the drive-side and driven-side pivot members 101 and 100 are linked by the transmission rod 102 to be reliably maintained while avoiding any increase in the number of components.

An embodiment of the present invention is explained above, but the present invention is not limited to the above-mentioned embodiment and may be modified in a variety of ways as long as the modifications do not depart from the spirit and scope thereof.

The invention claimed is:

1. A door opening and closing device for a vehicle comprising: a door lock device mounted on a door and comprising a latch mechanism that can switch between a locked state in which opening of the door is disabled and an unlocked state in which opening of the door is enabled and a lock/unlock switching mechanism having a key operating force input member that pivots so as to switch between the locked state and the unlocked state of the latch mechanism;

a cylinder lock mounted on the door and having a rotor that pivots in response to a key operation; and a pivot rod having one end part linked to the rotor side so as to transmit to the key operating force input member side a pivoting force of the rotor pivoting in response to a key operation of the cylinder lock, wherein the door opening and closing device comprises pivoting force transmission means formed by housing a driven-side pivot member, a drive-side pivot member, and a transmission member within an extension case, the driven-side pivot member being coaxially and detachably linked to the key operating force input member in a relatively non-pivotable manner, the drive-side pivot member, being disposed at a position spaced from the driven-side pivot member, and being coaxially and detachably linked to the other end part of the pivot rod in a relatively non-pivotable manner, the transmission member being provided between the drive-side and driven-side pivot members so as to transmit a pivoting force from the drive-side pivot member to the driven-side pivot member, the extension case pivotably supporting the driven-side pivot member and the drive-side pivot member, and the extension case being detachably mounted on a casing of the door lock device so as to extend from the casing.

2. The door opening and closing device for a vehicle according to claim 1, wherein the drive-side and driven-side pivot members are provided with link arm portions respectively, and opposite end parts of a transmission rod, which is the transmission member, are engaged with the link arm portions of the drive-side and driven-side pivot members.

3. The door opening and closing device for a vehicle according to claim 2, wherein a first engagement hole is provided in the link arm portion of one of the drive-side and driven-side pivot members, a second engagement hole having an axis parallel to the first engagement hole and an insertion hole intersecting an intermediate part of the second engagement hole at right angles are provided in the link arm portion of the other of the drive-side and driven-side members, a rod-shaped first engagement portion detachably engaged with the first engagement hole is provided integrally with one end part of the transmission rod so as to be connected at right angles, a second engagement portion detachably engaged with the second engagement hole is provided integrally with the other end part of the transmission rod, and the second engagement portion is formed so that the second engagement portion can be inserted into the insertion hole when the transmission rod is in a first attitude in which the first engagement portion is disposed on a plane perpendicular to the axes of the first and second engagement holes and the second engagement portion engages with the second engagement hole when the transmission rod in a state in which the second engagement portion is inserted into the insertion hole is put in a second attitude in which the transmission rod is pivoted by 90 degrees from the first attitude.

* * * * *